United States Patent
Anthony

(10) Patent No.: US 6,773,582 B2
(45) Date of Patent: Aug. 10, 2004

(54) DRINKING WATER TREATMENT SYSTEM INCLUDING HYDROGEN SULFIDE SCRUBBER USING TRIAZINE COMPOUND AND ASSOCIATED METHODS

(75) Inventor: Patrick M. Anthony, Mt. Dora, FL (US)

(73) Assignee: Precision Control Technology, Inc., Tauares, FL (US)

( * ) Notice: Subject to any disclaimer, the term of this patent is extended or adjusted under 35 U.S.C. 154(b) by 85 days.

(21) Appl. No.: 10/254,327

(22) Filed: Sep. 25, 2002

(65) Prior Publication Data

US 2004/0055463 A1 Mar. 25, 2004

(51) Int. Cl.$^7$ ............................ B01D 53/14; C02F 1/00
(52) U.S. Cl. ................ 210/188; 210/199; 210/748; 210/758; 95/8; 95/158; 95/199; 95/235; 96/234; 96/290; 96/244; 422/171; 423/220; 423/226
(58) Field of Search ................ 96/244; 95/8, 235, 95/158, 258, 254, 236, 199; 423/220, 221, 226, 227; 296/290, 234; 422/177, 171; 210/748, 758, 188, 764, 199

(56) References Cited

U.S. PATENT DOCUMENTS 3,387,431 A * 6/1968 Siebert ...................... 95/136
4,508,545 A * 4/1985 DeLoach .................... 95/258
5,061,373 A 10/1991 Gallup (List continued on next page.)

OTHER PUBLICATIONS

2001 Annual Drinking Water Report, Utilities Water Division, Orange County Government, Florida.
Industrial Air Solutions, 2001, Gas Wet Scrubber Tower Packing Media, available at www.industrialairsolutions.com/wet–scrubbers/tripac.htm.

$Q^2$ Technologies, 2001, ENVIRO–SCRUB® Process, available at www.q2technologies.com/escrub.htm.
$Q^2$ Technologies, 2001, Enviro–Tek™ Process, available at www.q2technologies.com/etek.htm.
Champion Technologies, $H_2S$ Scavenging Technology, available at www.champ–tech.com/h2scavenging.asp.
Quaker Chemical Corporation, 2000, Worldwide Innovations, available at www.quakerchem.com/products/product$_{13}$ desc.htm.
Quaker Chemical Corporation, 2000, Customer Processes & Applications, Available at www.quakerchem.com/products/by_app.htm.
Gary J. Nagl, Article entitled "Controlling $H_2S$ Emissions In Geothermal Power Plants", available at www.gtp–merichem.com/whats_geo_euro.htm.
Met–Pro Corporation, 2000, Duall Division Various Fume and Gas Wet Scrubbers, available at www.met–pro.com/html/duall.htm.

*Primary Examiner*—Duane S. Smith
(74) *Attorney, Agent, or Firm*—Allen, Dyer, Doppelt, Milbrath & Gilchrist, P.A.

(57) ABSTRACT

A drinking water treatment system includes a pump for pumping water from an aquifer, an aerator connected downstream from the pump for generating an outlet water flow and a hydrogen sulfide-containing gas flow, and a hydrogen sulfide scrubber for scrubbing the hydrogen sulfide-containing gas flow from the aerator. The hydrogen sulfide scrubber includes at least one scrubber tank and scrubber media contained therein. A scrubbing solution circulator includes a dispenser for dispensing scrubbing solution into contact with the scrubber media, a sump for collecting the scrubbing solution after contact with the scrubber media, and a circulating pump for circulating the scrubbing solution from the sump back to the dispenser after contact with the scrubber media. A triazine compound supply is provided for supplying a triazine compound to the scrubbing solution. The triazine compound may be used in place of caustic to reduce build-up in the scrubber

49 Claims, 8 Drawing Sheets

U.S. PATENT DOCUMENTS

| | | | |
|---|---|---|---|
| 5,128,049 A | * 7/1992 | Gatlin | 210/752 |
| 5,135,684 A | 8/1992 | Mohn et al. | |
| 5,288,728 A | 2/1994 | Spears et al. | |
| 5,314,672 A | * 5/1994 | Vasil | 423/228 |
| 5,347,003 A | 9/1994 | Trauffer et al. | |
| 5,354,459 A | * 10/1994 | Smith | 210/188 |
| 5,356,458 A | * 10/1994 | Javadi et al. | 95/13 |
| 5,405,591 A | * 4/1995 | Galloway | 423/228 |
| 5,462,721 A | * 10/1995 | Pounds et al. | 423/226 |
| 5,478,536 A | * 12/1995 | Galloway | 422/234 |
| 5,480,860 A | 1/1996 | Dillon | |
| 5,549,820 A | 8/1996 | Bober et al. | |
| 5,554,349 A | * 9/1996 | Rivers et al. | 423/228 |
| 5,667,558 A | 9/1997 | Bryan et al. | |
| 5,667,651 A | 9/1997 | Bryan | |
| 5,688,478 A | 11/1997 | Pounds et al. | |
| 5,698,171 A | 12/1997 | Trauffer et al. | |
| 5,885,538 A | 3/1999 | Trauffer et al. | |
| 6,063,346 A | 5/2000 | Luna | |

* cited by examiner

DRINKING WATER TREATMENT SYSTEM INCLUDING HYDROGEN SULFIDE SCRUBBER USING TRIAZINE COMPOUND AND ASSOCIATED METHODS

FIELD OF THE INVENTION

The present invention relates to the field of drinking water treatment and, more particularly, to the field of hydrogen sulfide scrubbing in a drinking water treatment system.

BACKGROUND OF THE INVENTION

Drinking water is typically extracted from an aquifer and processed in a water treatment system to remove undesired contaminants and impurities, and add a sanitizer, such as chlorine, for example. Water taken from an aquifer may contain a high hydrogen sulfide content, because of surrounding geological features and/or the action of certain bacteria. Unfortunately, hydrogen sulfide gas has an unpleasant odor and it is undesirable to discharge into the atmosphere that can then annoy residents of surrounding neighborhoods, for example.

Some water treatment plants remove or scrub hydrogen sulfide from the water with a caustic scrubbing solution, such as including potassium hydroxide or sodium hydroxide. In such a system, water pumped from the aquifer is first passed through an aerator for extracting a hydrogen sulfide-containing gas flow from the water. The hydrogen sulfide-containing gas flow is then passed through a hydrogen sulfide scrubber including at least one scrubber tank through which the caustic scrubbing solution is circulated and constantly replenished.

A common configuration of a hydrogen sulfide scrubber includes two scrubber tanks each having generally lightweight scrubber media therein. The scrubber tanks may be as offered by the Duall Division of Met-Pro Corporation of Owosso, Mich. under the model series designation PT-500. The scrubber media may be in the form of hollow spheres with passageways therein to provide a large surface area to enhance the capture of hydrogen sulfide from the gas flow and into the scrubbing solution. The hydrogen sulfide scrubber may also include first and second scrubbing solution circulators, each dispensing a scrubbing solution into contact with the scrubber media, a sump for collecting the scrubbing solution, and a circulating pump for circulating the scrubbing solution from the sump and back to the dispenser. The scrubbing solution includes caustic to adjust the pH to a desired level at which the hydrogen sulfide will more readily dissolve into the scrubbing solution.

The caustic material, however, causes a build-up in the scrubber tank, and especially on the scrubber media. This build-up covers and may block the passageways in the scrubber media and reduce the available surface area for extracting the hydrogen sulfide. The build-up also increases the weight of the scrubber media and reduces movement during scrubbing. Moreover, the increased weight may also stress the supporting structure of the tank.

Periodic cleaning is recommended for caustic-based hydrogen sulfide scrubbers. Such cleaning is generally performed by acid washing and is relatively difficult. Accordingly, maintenance may be postponed until the removal of hydrogen sulfide is no longer acceptable. At this point, very costly replacement of the scrubber media may be needed. The use of caustic further requires careful handling, and is relatively expensive when the cost of removing the build-up is considered. The use of caustic also requires a considerable flow of make-up water and a corresponding relatively large discharge of spent scrubber solution into the sewer system.

SUMMARY OF THE INVENTION

In view of the foregoing background, it is therefore an object of the present invention to provide a cost effective and relatively simple process to treat hydrogen sulfide in a drinking water system while reducing build-up and the need for maintenance.

This and other objects, features and advantageous of the present invention are provided by a drinking water treatment system which uses triazine compound in the scrubber solution. For example, the triazine compound may be SCRUB-IT™. More particularly, the system may comprise a pump for pumping water from an aquifer, an aerator connected downstream from the pump for generating an outlet water flow and a hydrogen sulfide-containing gas flow by extracting hydrogen sulfide from the water, and a sanitizer for sanitizing the outlet water flow from the aerator to make drinking water.

The drinking water system may further comprise a hydrogen sulfide scrubber for scrubbing the hydrogen sulfide-containing gas flow from the aerator. The hydrogen sulfide scrubber may comprise at least one scrubber tank and scrubber media therein. The scrubber may also include a scrubbing solution circulator comprising a dispenser for dispensing scrubbing solution into contact with the scrubber media, a sump for collecting the scrubbing solution after contact with the scrubber media, and a circulating pump for circulating the scrubbing solution from the sump back to the dispenser after contact with the scrubber media.

Moreover, the hydrogen sulfide scrubber may further comprise a triazine compound supply for supplying the triazine compound to the scrubbing solution. The triazine compound effectively reduces the hydrogen sulfide content without causing extensive build-up within the tank and on the media as does caustic, for example.

The at least one scrubber tank may include first and second scrubber tanks. The first scrubber tank may have a gas flow inlet connected to the aerator to receive the hydrogen sulfide-containing gas flow therefrom, and a gas flow outlet. The second scrubber tank may have a gas flow inlet connected to the gas flow outlet of the first scrubber tank. In other words, a two-stage scrubber may be used. Accordingly, a first scrubbing solution circulator may use a first scrubbing solution in the first scrubber tank, and a second scrubbing solution circulator may use a second scrubbing solution in the second scrubber tank.

In accordance with another important aspect of the invention, the triazine compound supply may be connected to only the second scrubbing solution circulator. A scrubbing solution charging line may be included for supplying a portion of the second scrubbing solution to the first scrubbing solution to charge the first scrubbing solution with the triazine compound. This arrangement provides efficient scrubbing yet reduces consumption of the triazine compound.

The drinking water treatment system may still further comprise a controller for controlling the triazine compound supply and hydrogen sulfide sensors associated with the first and second scrubber tanks that are connected to the controller. The controller controls the triazine compound supply based upon the hydrogen sulfide sensors.

Yet another aspect of the invention relates to the sensing of hydrogen sulfide. In particular, the hydrogen sulfide sensors may comprise an inlet gas sensor which includes a sampling tube having an inlet connected in fluid communication with the hydrogen sulfide-containing gas flow from the aerator to the first scrubber tank. The hydrogen sulfide sensor may also include a hydrogen sulfide sensing device positioned remote from the aerator and connected to the outlet of the sampling tube. A purge pump may be connected to the sampling tube adjacent the outlet thereof. A condensation drain valve may also be connected to the sampling tube to drain accumulated condensation from within the sampling tube. The controller may periodically operate the purge pump and the condensation drain valve to enhance the accuracy of the readings. The sensor, purge pump, and drain valve may be positioned within a housing of the controller. A similar outlet gas sensor may also be provided which includes a sampling tube having an inlet connected in fluid communication with a discharge gas flow from the second scrubber tank.

The drinking water treatment system may further comprise a make-up water supply connected to the second scrubbing solution circulator. In some embodiments, the hydrogen sulfide scrubber may further comprise a caustic supply and a switchover valve arrangement for permitting selective alternate operation using the caustic supply or the triazine compound supply. This permits a scrubber to be operated using either scrubbing solution chemistry.

One method aspect is for operating a hydrogen sulfide scrubber using a triazine compound in the scrubbing solution. Another method aspect of the present invention is for retrofitting a hydrogen sulfide scrubber of a drinking water treatment system from a caustic supply to a triazine compound supply. The method may comprise disconnecting the caustic supply for the first and second scrubber tanks, connecting the triazine compound supply for the second scrubber tank, and connecting a charging line between the second scrubber tank and the first scrubber tank.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notation are used to indicate similar elements in alternate embodiments.

Figure 1:
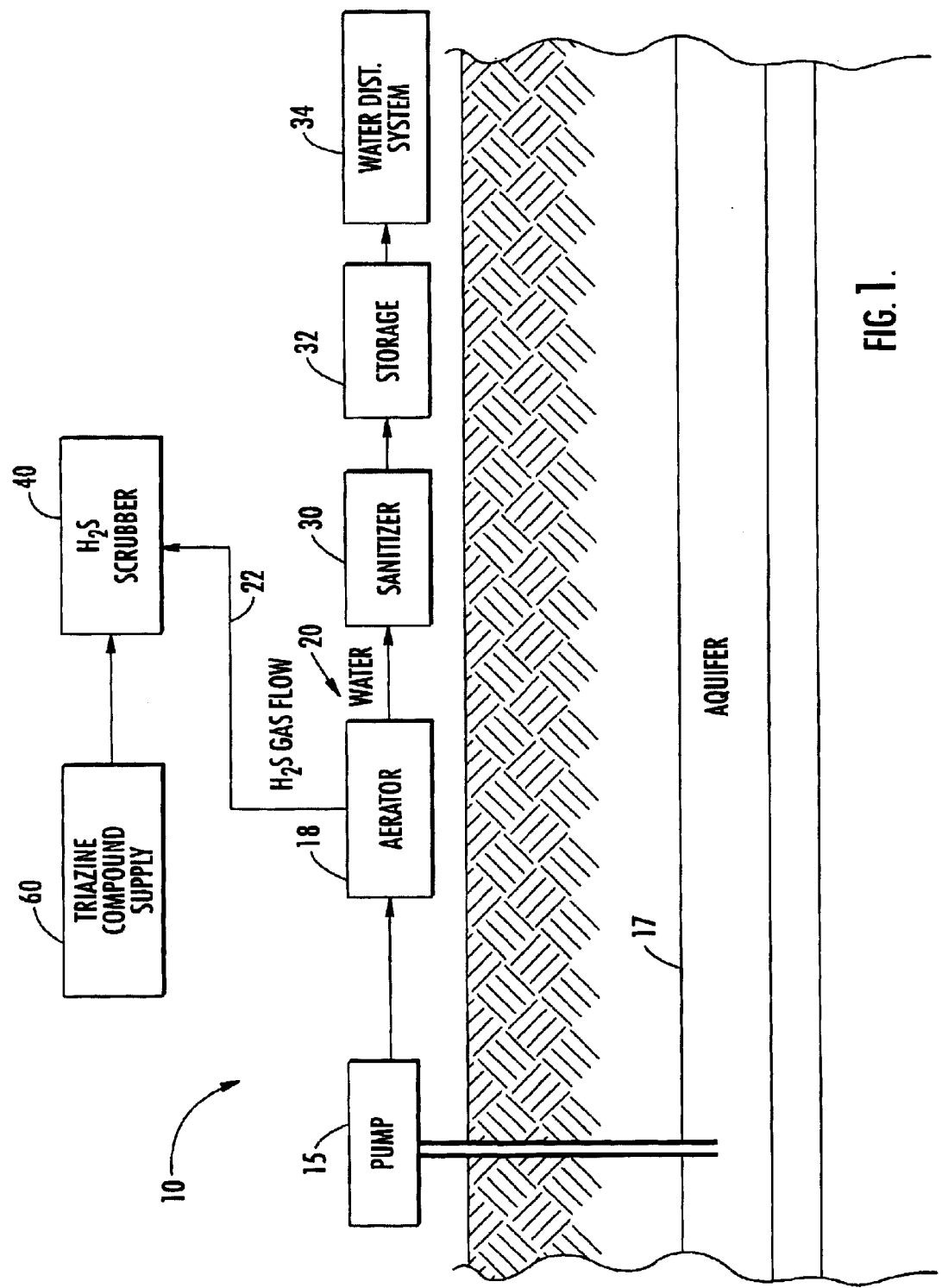
FIG. 1 is a schematic diagram of a water treatment system according to the present invention.
Figure 2:
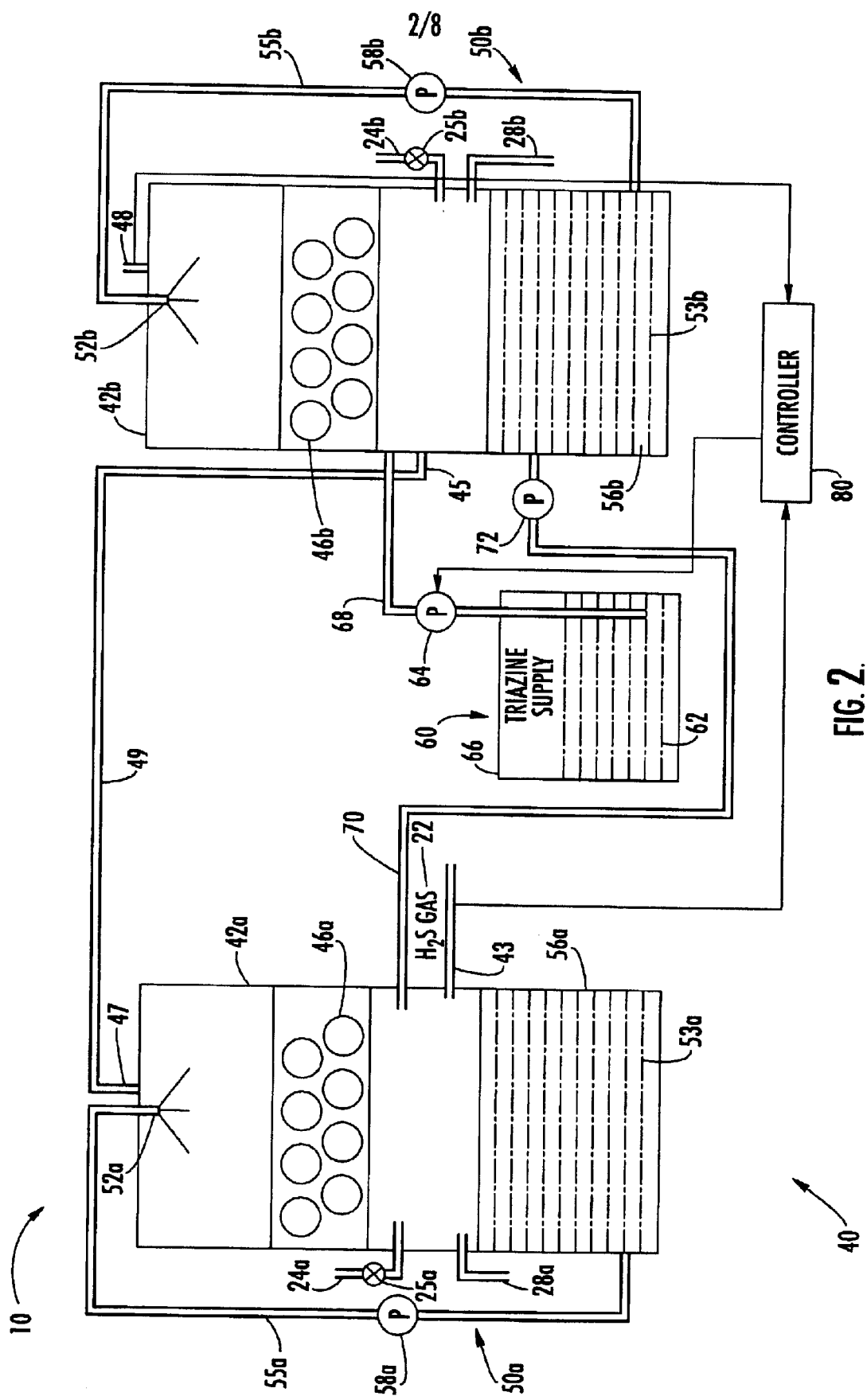
FIG. 2 is a more detailed schematic diagram of the hydrogen sulfide scrubber and controller of the water treatment system in FIG. 1.

Referring initially to FIGS. 1 and 2, a drinking water treatment system 10 is now described. The drinking water treatment system 10 illustratively includes a pump 15 for pumping water from an aquifer 17 which is below ground level. For example, the aquifer 17 may be between 100 and 1000 feet below ground level.

The drinking water treatment system 10 also illustratively comprises an aerator 18 downstream from the pump 15 for generating an outlet water flow 20 and a hydrogen sulfide-containing gas flow 22 by extracting hydrogen sulfide from the water. A sanitizer 30 for sanitizing the outlet water flow 20 is connected downstream from the aerator 18 to make drinking water. The sanitizer 30 may, for example, be provided by a chlorinator, ultra-violet light exposure, or other sanitizing processes as understood by those skilled in the art. Depending on the needs of the community, the drinking water treatment system 10 may include a storage facility 32 for storing the sanitized water before it is dispensed to the community through a water distribution system 34. Of course, the drinking water treatment system 10 may include processing stages that have been omitted for clarity as needed to treat water in different communities, e.g., fluorination and filtration, as understood by those skilled in the art.

The drinking water treatment system 10 further illustratively comprises a hydrogen sulfide scrubber 40 for scrubbing the hydrogen sulfide-containing gas flow 22 from the aerator 18. Referring more particularly to FIG. 2, the hydrogen sulfide scrubber 40 includes a first scrubber tank 42a and a second scrubber tank 42b.

The first scrubber tank 42a illustratively includes a gas flow inlet 43 connected to the aerator 18 to receive the hydrogen sulfide-containing gas flow 22 therefrom. A gas flow outlet 47 is illustratively included at an upper portion of the first scrubber tank 42a. The second scrubber tank 42b illustratively includes a gas flow inlet 45 connected to the gas flow outlet 47 of the first scrubber tank 42a via a gas flow line 49. The second scrubber tank 42b further includes a gas flow outlet 48 at an upper portion thereof from which the treated gas flow is discharged to the atmosphere.

Scrubber media 46a, 46b are illustratively contained within the first and second scrubber tanks 42a, 42b. The scrubber media 46a, 46b may, for example, be provided by generally lightweight and hollow spheres made of polypropylene material. Such spheres are available from Tri-Pac of Raleigh, N.C. under the trade name Tri-Packs®. Other scrubbing media is also contemplated by the present invention.

The hydrogen sulfide scrubber 40 further illustratively comprises first and second scrubbing solution circulators 50a, 50b connected to each of the first and second scrubber tanks 42a, 42b. The first scrubbing solution circulator 50a uses a first scrubbing solution 53a and the second scrubbing solution circulator 50b uses a second scrubbing solution 53b.

The scrubbing solution circulators 50a, 50b include dispensers 52a, 52b for dispensing the first and second scrubbing solutions 53a, 53b into contact with the scrubber media 46a, 46b. The scrubbing solution circulators 50a, 50b also include sumps 56a, 56b for collecting the first and second scrubbing solutions 53a, 53b after contact with the scrubber media 46a, 46b, and circulating pumps 58a, 58b for circulating the first and second scrubbing solutions from the sumps back to the dispensers 52a, 52b after contact with the scrubber media. The scrubbing solution circulators 50a, 50b include circulator lines 55a, 55b connected between the sump 56a, 56b and the dispensers 52a, 52b. The circulating pumps 58a, 58b may be connected to the circulator lines 55a, 55b to circulate the first and second scrubbing solutions 53a, 53b from the sumps 56a, 56b to the dispensers 52a, 52b.

The hydrogen sulfide scrubber 40 further illustratively comprises a triazine compound supply 60 for supplying a triazine compound 62 to the second scrubbing solution 53b. The triazine compound 62 may comprise SCRUB-IT™ by Quaker Chemicals™ of Conshohocken, Pa., for example, or another triazine compound as understood by those skilled in the art. The triazine compound 62 captures the hydrogen sulfide into the scrubber solution 53a, 53b.

A triazine compound supply pump 64 may be connected to the triazine compound supply 60 to pump the triazine compound 62 from a triazine compound storage container 66 to the second scrubbing solution circulator 50b. A triazine compound line 68 illustratively extends between the triazine compound storage container 66 and the second scrubber tank 42b to deliver a triazine compound 62 to the second scrubbing solution 53b. The triazine compound supply 60 is illustratively supplied to only the second scrubbing solution circulator 50b.

The hydrogen sulfide scrubber 40 further illustratively comprises a scrubbing solution charging line 70 for supplying a portion of the second scrubbing solution 53b to the first scrubbing solution 53a to charge the first scrubbing solution with the triazine compound 62. The scrubbing solution charging line 70 is illustratively connected between the first scrubber tank 42a and second scrubber tank 42b. A charging line pump 72 is connected to the scrubber solution charging line 70 to pump a portion of the second scrubbing solution 53b from the sump 56b of the second scrubber tank 42b to the sump 56a of the first scrubber tank 42a. The pump 72 may not be needed in other embodiments, such as where the scrubbing solution is diverted from the pressure side of the circulating pump 58b, for example.

A make-up water supply 24a, 24b is illustratively connected to the each of the first and second scrubber tanks 42a, 42b to supply make-up water to the first and second scrubbing solutions 53a, 53b. When supplying the triazine compound 62 to the second scrubber tank 42, make-up water may only be supplied to the second scrubber tank under normal operating conditions. The second make-up water supply 24b may supply make-up water at a rate, e.g., 6 gallons per minute (gpm). Accordingly, the scrubbing solution charging line 70 supplies the first scrubbing solution 53a with a portion of the second scrubbing solution 53b at a substantially similar rate. Further, when supplying the triazine compound 62 to the second scrubbing solution 53b, the make-up water supply 24a of the first scrubber tank 42a may be turned off at the first make-up water valve 25a, while the second make-up water valve 25b is set to 6 gpm, for example. The first and second scrubber tanks 42a, 42b may further illustratively include overflow lines 28a, 28b for maintaining the first and second scrubbing solutions 53a, 53b at desired levels within the sumps 56a, 56b.

Figure 3:
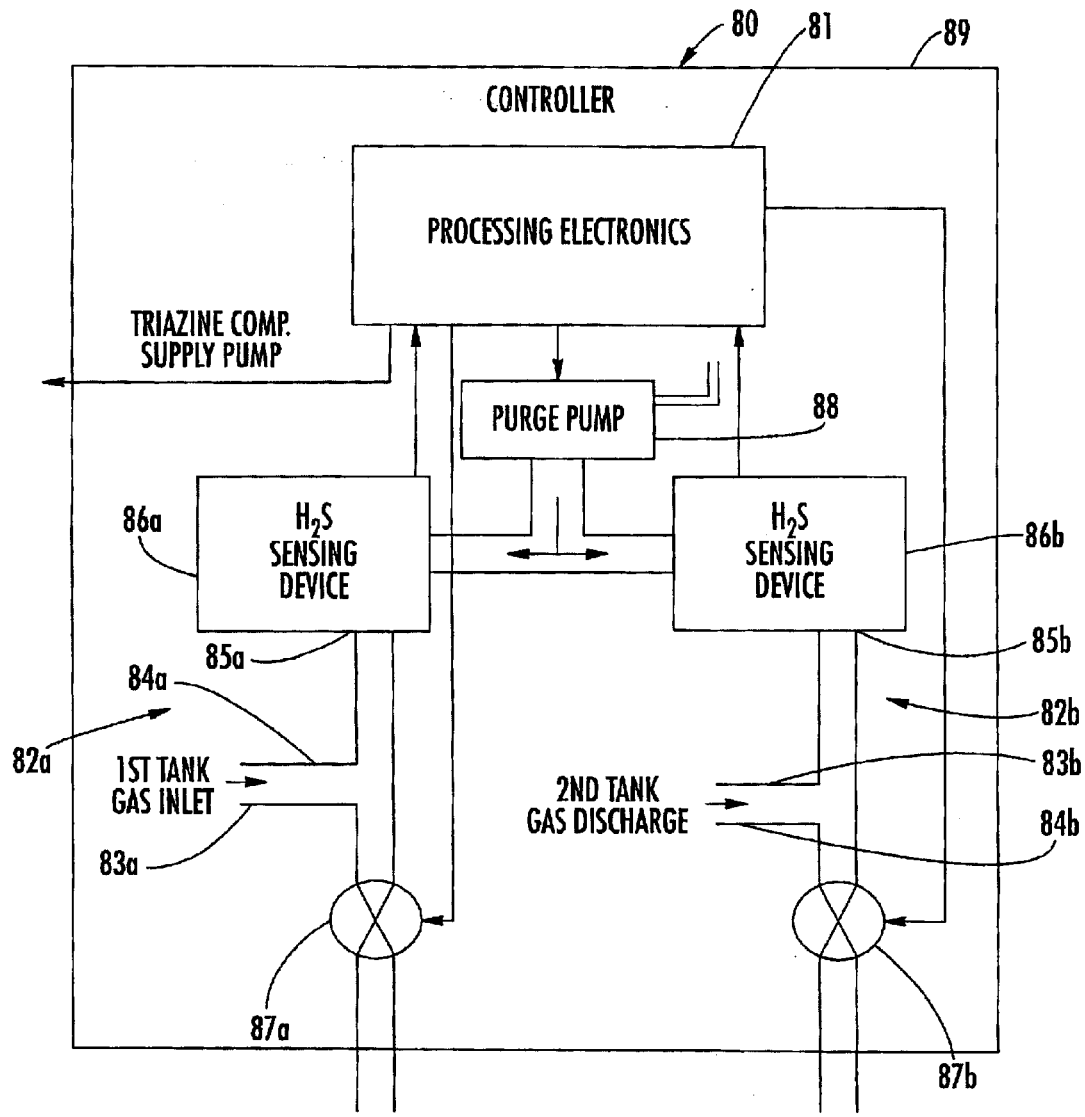
FIG. 3 is a more detailed schematic diagram of the controller and hydrogen sulfide sensors of the water treatment system in FIG. 1.

Turning now additionally to FIG. 3, a controller 80 for controlling the triazine compound supply 60 is now described in more detail. The controller 80 is illustratively connected to the triazine compound supply pump 64 to regulate the amount of triazine compound 62 to be supplied to the second scrubbing solution 53b. The controller 80 illustratively includes a housing 89 containing processing electronics 81, such as a circuit board for example, having circuitry for controlling the triazine compound supply 60 as understood by those skilled in the art. Hydrogen sulfide sensors including an inlet gas sensor 82a and a discharge gas sensor 82b are connected to the processing electronics 81. Accordingly, the controller 80 controls the triazine compound supply 60 based upon the inlet gas sensor 82a and discharge gas sensors 82b.

The inlet gas sensor 82a includes a sampling tube 83a having an inlet 84a that is illustratively connected in fluid communication with the hydrogen sulfide-containing gas flow 22 from the aerator 18 and into the inlet 43 of the first scrubber tank. The sampling tube 83a of the inlet gas sensor 82a also illustratively includes an outlet 85a. A hydrogen sulfide sensing device 86a is positioned remote from the aerator 18 illustratively within the controller housing 89, and is connected to the outlet 85a of the sampling tube 83a. Similarly, the discharge gas sensor 82b includes a sampling tube 83b having an inlet 84b connected in fluid communication to the discharge gas flow 48 from the second scrubber tank 42b. The sampling tube 83b of the discharge gas sensor 82b also illustratively includes an outlet 85b. A hydrogen sulfide sensing device 86b is positioned remote from the second scrubber tank 42b and within the housing 89, and is connected to the outlet 85b of the sampling tube 83b.

A purge pump 88 is provided within the controller housing 89, and is illustratively connected to the processing electronics 81 and the sampling tubes 83a, 83b adjacent the outlets 85a, 85b. Condensation drain valves 87a, 87b are also illustratively connected to the processing electronics 81 and the sampling tubes 83a, 83b. The controller 80 periodically operates the purge pump 88 and the condensation drain valves 87a, 87b to drain condensation from within the sampling tubes 83a, 83b to thereby obtain more accurate hydrogen sulfide readings as will be appreciated by those skilled in the art.

Figure 4:
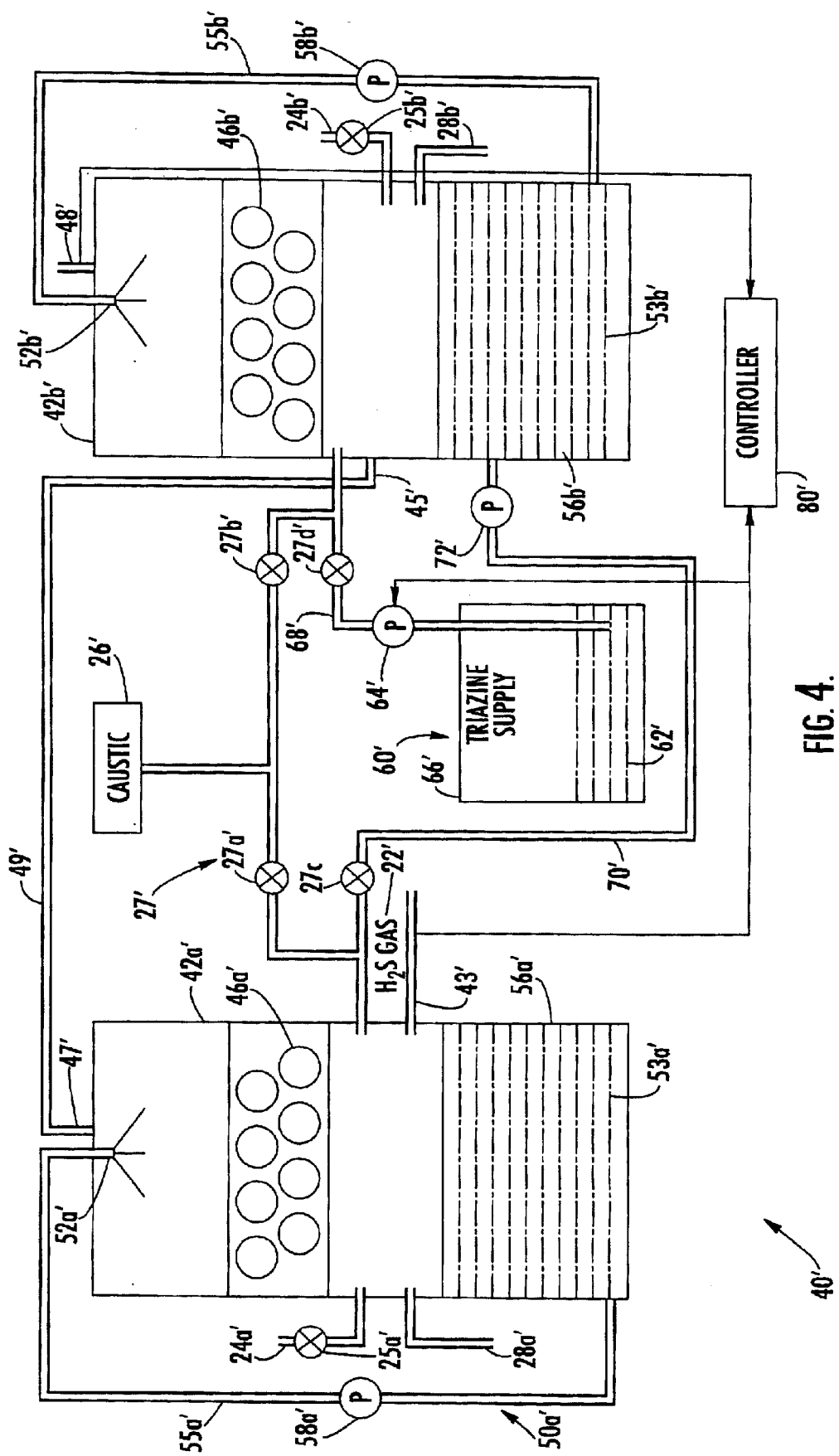
FIG. 4 is a schematic diagram of another embodiment of a water treatment system having both caustic and triazine supplies according to the present invention.

Turning now more particularly to FIG. 4, a second embodiment of the hydrogen sulfide scrubber 40' is now described. In the second embodiment, the hydrogen sulfide scrubber 40' comprises a caustic supply 26' illustratively connected to the first and second scrubber tanks 42a', 42b'. A switchover valve arrangement 27' for permitting selective alternate operation using the caustic supply 26' or the triazine compound supply 60' is also included. More specifically, when use of the triazine compound supply 60' is desired, valves adjacent the caustic supply 27a', 27b' are closed to cut off the supply of caustic material. A valve 27d' for the triazine compound supply 60' is opened to allow the triazine compound 62' to be supplied to the second scrubbing solution 53b'. Further, a valve on the charging line 27c' is opened to allow charging of the first scrubbing solution 53a' with a portion of the second scrubbing solution 53b'. When using the caustic supply 26', make-up water is supplied to both the first and second scrubbing solution circulators 50a', 50b'. The opposite valve configuration is employed to again use the caustic. The other elements of the second embodiment of the hydrogen sulfide scrubber 40' are similar to those of the first embodiment, are identified using prime notation and require no further discussion herein. Since the use of the triazine compound 62 in a drinking water treatment system 10 is novel, many drinking water treatment plant operators may be reluctant to remove existing caustic based equipment without first trial testing the triazine compound. Accordingly, the retrofitting and switchover feature advantageously permits water treatment plant operators to become familiar and gain experience with the use of the triazine compound 62 in the water treatment process before making a commitment to retire existing caustic based equipment.

Figure 5:
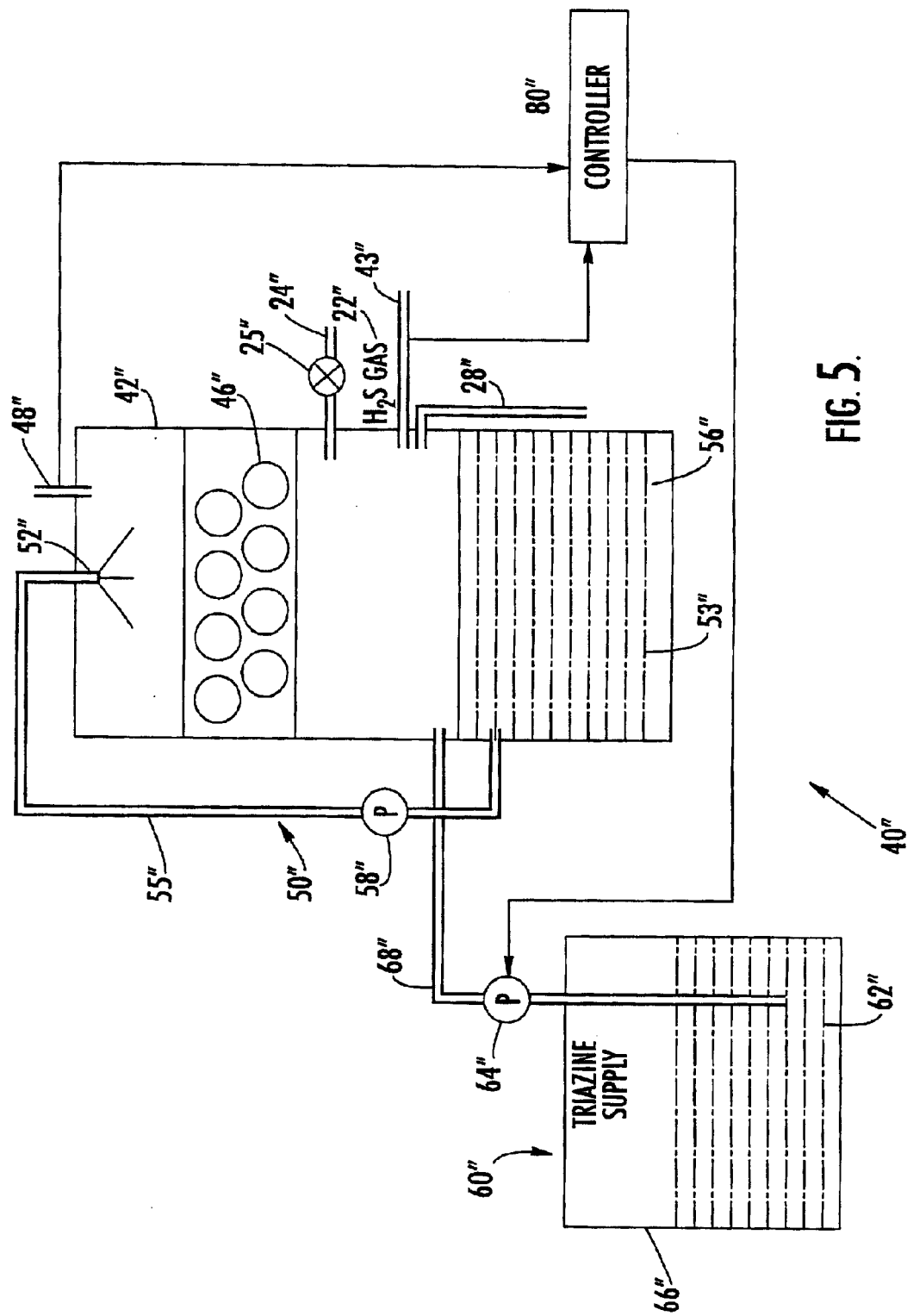
FIG. 5 is a schematic diagram of still another embodiment of the water treatment system according to the present invention.

Turning now additionally to FIG. 5, a third embodiment of the hydrogen sulfide scrubber 40" is now described. The third embodiment of the hydrogen sulfide scrubber 40" illustratively includes only a single scrubber tank 42". In accordance with this embodiment, a single stage of hydrogen sulfide reduction is provided using the triazine compound supply 60". The other elements of the third embodiment of the hydrogen sulfide scrubber 40" are similar to those of the first and second embodiments, are identified using double prime notation, and require no further discussion herein.

Figure 6:
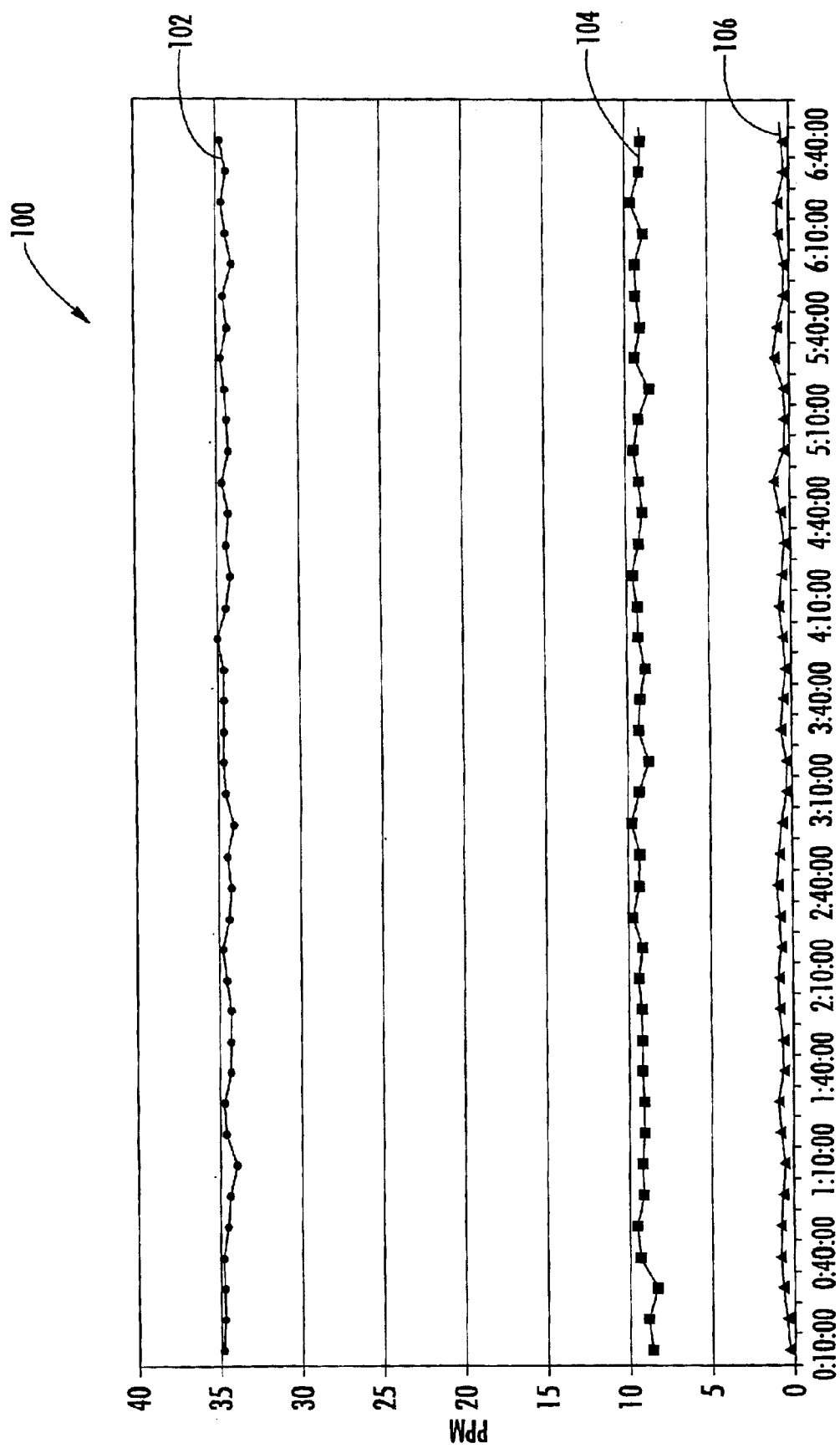
FIG. 6 is a graph illustrating hydrogen sulfide content measurements during stages of treatment for an example according to the present invention.

Turning now additionally to FIG. 6, a graphical illustration 100 of hydrogen sulfide content taken at various stages of the drinking water treatment system 10 in accordance with an example of the invention is now described. The graph uses data collected when 4.38 gallons of triazine compound (SCRUB-IT™) were consumed per hour. A first set of data points 102 indicate the relatively high hydrogen sulfide content of the hydrogen sulfide-containing gas flow 22 from the aerator 18 and to the first scrubber tank 42a. A second set of data points 104 indicate the reduced hydrogen sulfide content at the gas flow outlet 47 of the first scrubber tank 42a. A third set of data points 106 indicate the final reduced hydrogen sulfide content at the gas flow outlet 48 of the second scrubber tank 42b. The data points 102, 104, 106 of the graph 100 illustrate the advantageous reduction of hydrogen sulfide content as hydrogen sulfide-containing gas is treated with triazine compound 62 in the hydrogen sulfide scrubber 40 of the present invention.

Figure 7:
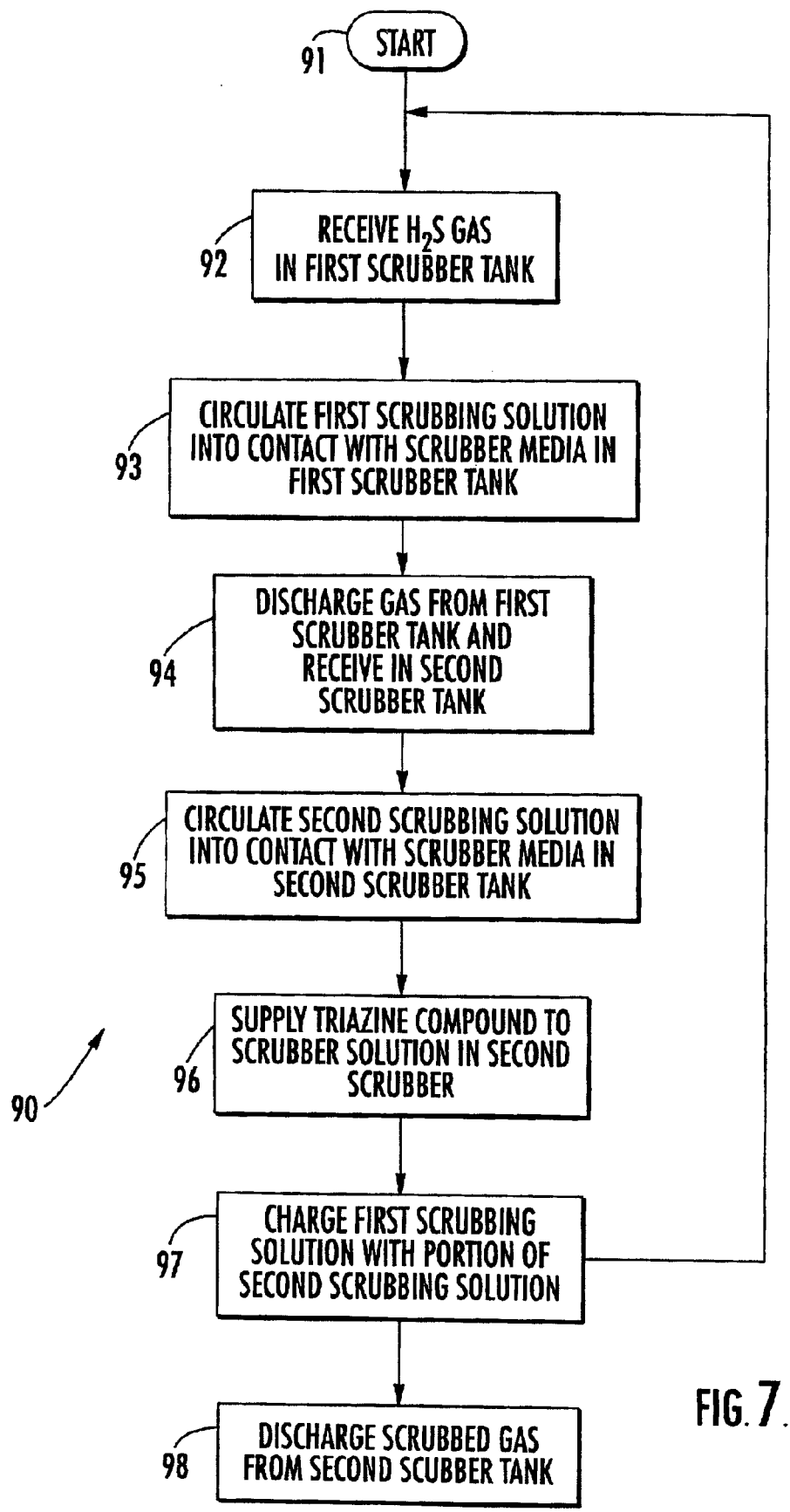
FIG. 7 is a flow chart illustrating a method of scrubbing hydrogen sulfide according to the present invention.

Turning now additionally to the flow chart 90 of FIG. 7, a method of scrubbing a hydrogen sulfide-containing gas flow 22 from an aerator 18 in a drinking water treatment system 10 is now described. From the start (Block 91), hydrogen sulfide-containing gas flow 22 is received in the first scrubber tank 42a at Block 92. At Block 93, the first scrubbing solution is circulated into contact with scrubber media 46a in the first scrubber tank 42a. At Block 94, gas is discharged from the first scrubbing tank 42a and received in the second scrubber tank 42b. The second scrubbing solution 53b is circulated into contact with scrubber media 46b in the second scrubber tank 42b at Block 95. At Block 96 triazine compound 62 is supplied to the second scrubber solution 53b. The first scrubber solution 53a is charged with a portion of the second scrubber solution 53b at Block 97. During this process, hydrogen sulfide-containing gas 22 is continuously received at Block 92. At Block 98, the scrubbed gas is discharged from the second scrubber tank 42b.

Figure 8:
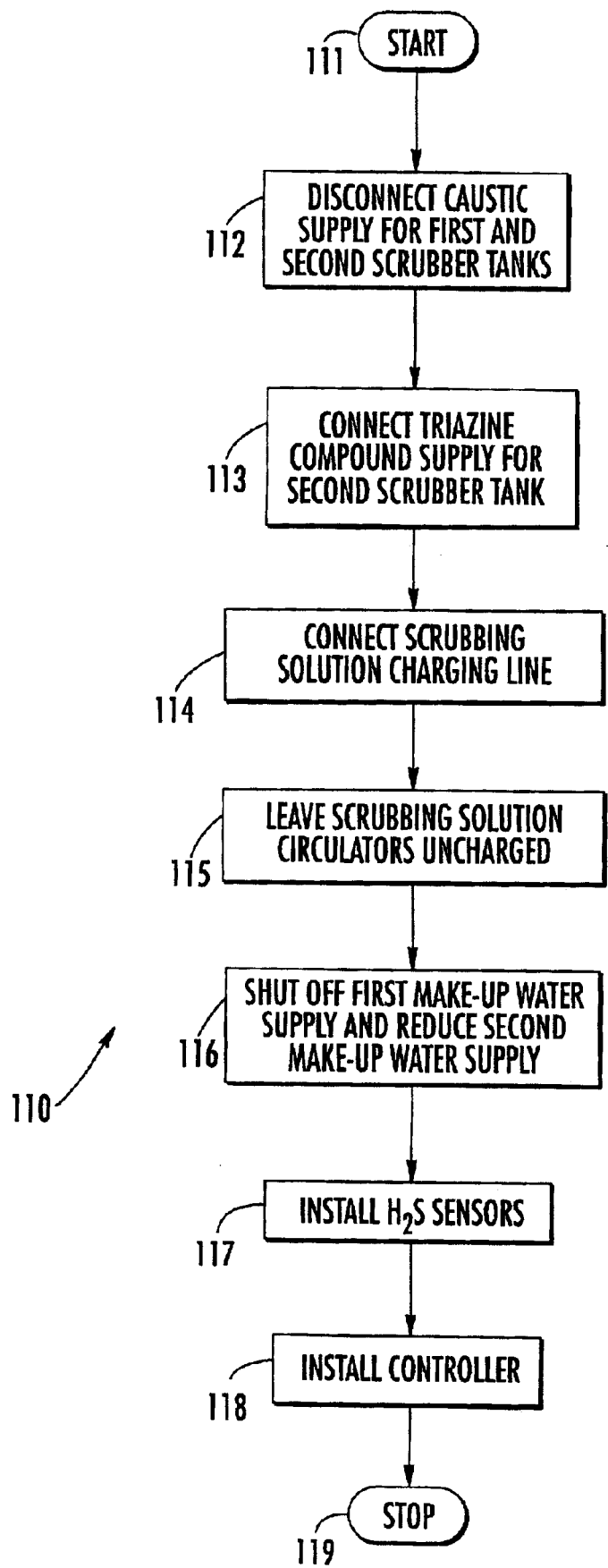
FIG. 8 is a flow chart illustrating a method of retrofitting a hydrogen sulfide scrubber according to the present invention.

Turning now additionally to the flow chart 110 of FIG. 8 and again to FIG. 4, a method of retrofitting the hydrogen sulfide scrubber 40 of the drinking water treatment system 10 from a caustic supply 26' to a triazine compound supply 60' is now described. From the start (Block 111), the caustic supply 26' for the first and second scrubber tanks 42a', 42b' are disconnected or shut off by valve arrangement 27' at Block 112. At Block 113, the triazine compound supply 60' is connected to the second tank 42b'. A scrubbing solution charging line 70 is connected between the second scrubber tank 42b and the first scrubber tank 42a' at Block 114. At Block 115 the scrubbing solution circulators 50a', 50b' are left unchanged. The make-up water supply 24a' of the first scrubber tank 42a' is turned off and the make-up water supply 24b' of the second scrubber tank 42b' is reduced at Block 116. At Block 117, the hydrogen sulfide sensors 82a', 82b' are installed and the controller 80' is installed at Block 118. The method is completed at Block 119.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

What is claimed is:

1. A drinking water treatment system comprising:
    a pump for pumping water from an aquifer;
    an aerator connected downstream from said pump for generating an outlet water flow and a hydrogen sulfide-containing gas flow by extracting hydrogen sulfide from the water;
    a sanitizer for sanitizing the outlet water flow from said aerator to make drinking water; and
    a hydrogen sulfide scrubber for scrubbing the hydrogen sulfide-containing gas flow from said aerator and comprising
        at least one scrubber tank and scrubber media contained therein,
        at least one scrubbing solution circulator comprising a dispenser for dispensing scrubbing solution into contact with said scrubber media, a sump for collecting the scrubbing solution after contact with said scrubber media, and a circulating pump for circulating the scrubbing solution from said sump back to said dispenser after contact with said scrubber media, and
        at least one triazine compound supply for supplying a triazine compound to the scrubbing solution.

2. A drinking water treatment system according to claim 1 wherein said at least one scrubber tank comprises:
    a first scrubber tank having a gas flow inlet connected to said aerator to receive the hydrogen sulfide-containing gas flow therefrom, and a gas flow outlet; and
    a second scrubber tank having a gas flow inlet connected to the gas flow outlet of said first scrubber tank.

3. A drinking water treatment system according to claim 2 wherein said at least one scrubbing solution circulator comprises a first scrubbing solution circulator using a first scrubbing solution in said first scrubber tank, and a second scrubbing solution circulator using a second scrubbing solution in said second scrubber tank.

4. A drinking water treatment system according to claim 3 wherein said at least one triazine compound supply is connected to only said second scrubbing solution circulator; and further comprising a scrubbing solution charging line for supplying a portion of the second scrubbing solution to the first scrubbing solution to charge the first scrubbing solution with the triazine compound.

5. A drinking water treatment system according to claim 4 further comprising a controller for controlling said at east one triazine compound supply.

6. A drinking water treatment system according to claim 5 further comprising at least one hydrogen sulfide sensor connected to said controller; and wherein said controller controls said at least one triazine compound supply based upon said at least one hydrogen sulfide sensor.

7. A drinking water treatment system according to claim 6 wherein said at least one hydrogen sulfide sensor comprises an inlet gas sensor including:

a sampling tube having an inlet connected in fluid communication with the hydrogen sulfide-containing gas flow to said first scrubber tank, and an outlet;

a hydrogen sulfide sensing device positioned remote from said aerator an connected to the outlet of said sampling tube;

a purge pump connected to said sampling tube adjacent the outlet thereof; and a condensation drain valve connected to said sampling tube.

8. A drinking water treatment system according to claim 7 wherein said controller periodically operates said purge pump and said condensation drain valve.

9. A drinking water treatment system according to claim 6 wherein said at least one hydrogen sensor comprises a discharge gas sensor including:

a sampling tube having an inlet connected in fluid communication with a discharge gas flow from said second scrubber tank, and an outlet;

a hydrogen sulfide sensing device positioned remote from said second scrubber tank and connected to the outlet of said sampling tube;

a purge pump connected to said sampling tube adjacent the outlet thereof; and a condensation drain valve connected to said sampling tube.

10. A drinking water treatment system according to claim 9 wherein said controller periodically operates said purge pump and said condensation drain valve.

11. A drinking water treatment system according to claim 3 further comprising a make-up water supply connected to said second scrubbing solution circulator.

12. A drinking water treatment system according to claim 1 wherein said hydrogen sulfide scrubber further comprises:

at least one caustic supply; and a switchover valve arrangement for permitting selective alternate operation using said at least one caustic supply or said at least one triazine compound supply.

13. A hydrogen sulfide scrubber for scrubbing hydrogen sulfide-containing gas from water extracted from an aquifer in a drinking water treatment system, the hydrogen sulfide scrubber comprising:

at least one scrubber tank;

scrubber media within said at least one scrubber tank;

at least one scrubbing solution circulator comprising a dispenser for dispensing scrubbing solution into contact with said scrubber media, a sump for collecting the scrubbing solution after contact with said scrubber media, and a circulating pump for circulating the scrubbing solution from said sump back to said dispenser after contact with said scrubber media; and at least one triazine compound supply for supplying a triazine compound to the scrubbing solution.

14. A hydrogen sulfide scrubber according to claim 13 wherein said at least one scrubber tank comprises:

a first scrubber tank having a gas flow inlet for receiving the hydrogen sulfide-containing gas flow, and a gas flow outlet; and a second scrubber tank having a gas flow inlet connected to the gas flow outlet of said first scrubber tank.

15. A hydrogen sulfide scrubber according to claim 14 wherein said at least one scrubbing solution circulator comprises a first scrubbing solution circulator using a first scrubbing solution in said first scrubber tank, and a second scrubbing solution circulator using a second scrubbing solution in said second scrubber tank.

16. A hydrogen sulfide scrubber according to claim 15 wherein said at least one triazine compound supply is connected to only said second scrubbing solution circulator; and further comprising a scrubbing solution charging line for supplying a portion of the second scrubbing solution to the first scrubbing solution to charge the first scrubbing solution with the triazine compound.

17. A hydrogen sulfide scrubber according to claim 16 further comprising a controller for controlling said at least one triazine compound supply.

18. A hydrogen sulfide scrubber according to claim 17 further comprising at least one hydrogen sulfide sensor connected to said controller; and wherein said controller controls said at least one triazine compound supply based upon said at least one hydrogen sulfide sensor.

19. A hydrogen sulfide scrubber according to claim wherein said at least one hydrogen sulfide sensor comprises an inlet gas sensor including:

a sampling tube having an inlet connected in fluid communication with the hydrogen sulfide-containing gas flow to said first scrubber tank, and an outlet;

a hydrogen sulfide sensing device positioned remote from said hydrogen sulfide-containing gas flow connected to the outlet of said sampling tube;

a purge pump connected to said sampling tube adjacent the outlet to thereof; and a condensate on drain valve connected to said sampling tube.

20. A hydrogen sulfide scrubber according to claim 19 wherein said controller periodically operates said purge pump and said condensation drain valve.

21. A hydrogen sulfide scrubber according to claim 18 wherein said at least one hydrogen sensor comprises a discharge gas sensor including:

a sampling tube having an inlet connected in fluid communication with a discharge gas flow from said second scrubber tank, and a outlet;

a hydrogen sulfide sensing device positioned remote from said second scrubber tank and connected to the outlet of said sampling tube;

a purge pump connected to said sampling tube adjacent the outlet thereof; and a condensation drain valve connected to said sampling tube.

22. A hydrogen sulfide scrubber according to claim 21 wherein said controller periodically operates said purge pump and said condensation drain valve.

23. A hydrogen sulfide scrubber according to claim 15 further comprising a make-up water supply connected to said second scrubbing solution circulator.

24. A hydrogen sulfide scrubber according to claim 13 further comprising:

at least one caustic supply; and a switchover valve arrangement for permitting selective alternate operation using said at least one caustic supply or said at lea to one triazine compound supply.

25. A hydrogen sulfide scrubber for a drinking water treatment system for scrubbing hydrogen sulfide-containing gas from water extracted from an aquifer in a drinking water treatment system, the hydrogen sulfide scrubber comprising:

a first scrubber tank having a gas flow inlet for receiving the hydrogen sulfide-containing gas flow, and a gas flow outlet;

a second scrubber tank having a gas flow inlet connected to the gas flow outlet off said first scrubber tank;

scrubber media within each of said first and second scrubber tanks;

a first scrubbing solution circulator using a first scrubbing solution i said first scrubber tank, and a second scrubbing solution circulator using a second scrubbing solution in said second scrubber tank, said first and second scrubbing solution circulators each comprising a dispenser for dispensing scrubbing solution into contact wit said scrubber media, a sump for collecting the scrubbing solution after contact with said scrubber media, and a circulating pump for circulating the scrubbing solution from said sump back to said dispenser after contact with said scrubber media; and at least on triazine compound supply for supplying a triazine compound to said second scrubbing solution circulator.

26. A hydrogen sulfide scrubber according to claim 25 further comprising a scrubbing solution charging line for supplying a portion of the second scrubbing solution to the first scrubbing solution to charge the first scrubbing solution with the triazine compound.

27. A hydrogen sulfide scrubber according to claim 26 further comprising a controller for controlling said at least one triazine compound supply.

28. A hydrogen sulfide scrubber according to claim 27 further comprising at least one hydrogen sulfide sensor connected to said controller; and wherein said controller controls said at least one triazine compound supply based upon said at least one hydrogen sulfide sensor.

29. A hydrogen sulfide scrubber according to claim 28 wherein said at least one hydrogen sulfide sensor comprises an inlet gas sensor including:

a sampling tube having an inlet connected in fluid communication with the hydrogen sulfide-containing gas flow to said first scrubber tank, and an outlet;

a hydrogen sulfide sensing device positioned remote from said hydrogen sulfide-containing gas flow and connected to the outlet of said sampling tube;

a purge pump connected to said sampling tube adjacent the outlet thereof; and a condensation drain valve connected to said sampling tube.

30. A hydrogen sulfide scrubber according to claim 29 wherein said controller periodically operates said purge pump and said condensation drain valve.

31. A hydrogen sulfide scrubber according to claim 28 wherein said at least one hydrogen sulfide sensor comprises a discharge gas sensor including:

a sampling tube having an inlet connected in fluid communication with a discharge gas flow from said second scrubber tank, and an outlet;

a hydrogen sulfide sensing device positioned remote from said second scrubber tank and connected to the outlet of said sampling tube;

a purge pump connected to said sampling tube adjacent the outlet to thereof; and a condensation drain valve connected to said sampling tube.

32. A hydrogen sulfide scrubber according to claim 31 wherein said controller periodically operates said purge pump and said condensation drain valve.

33. A hydrogen sulfide scrubber according to claim 25 further comprising a make-up water supply connected to said second scrubbing solution circulator.

34. A hydrogen sulfide scrubber according to claim 25 further comprising:

at least one caustic supply; and a switchover valve arrangement for permitting selective alternate operation using said at least one caustic supply or said at least one triazine compound supply.

35. A method for scrubbing hydrogen sulfide from a hydrogen sulfide-containing gas flow in a drinking water treatment system, the method comprising:

dispensing scrubbing solution from a dispenser into contact with scrubber media in at least one scrubber tank;

collecting he scrubbing solution in a sump after contact with the scrubber media;

circulating the scrubbing solution back to the dispenser after contact to with the scrubber media; and supplying a triazine compound to the scrubbing solution.

36. A method according to claim 35 wherein the at least one scrubber tank further comprises a first and a second scrubber tank, and wherein the method further comprises:

receiving the hydrogen sulfide-containing gas flow in the first scrubber tank;

discharging a gas from the first scrubber tank; and receiving the discharged gas from the first scrubber tank in the second scrubber tank.

37. A method according to claim 36 further comprising using a first scrubbing solution in the first scrubber tank and using a second scrubbing solution in the second scrubber tank.

38. A method according to claim 37 further comprising supplying the triazine compound to only the second scrubbing solution in the second scrubbing tank; and charging the first scrubbing solution with the triazine compound using a portion of the second scrubbing solution.

39. A method according to claim 38 further comprising sensing hydrogen sulfide content in the first and second scrubber tanks using a hydrogen sulfide sensor and controlling the triazine compound supply based upon the sensed hydrogen sulfide content.

40. A method according to claim 39 further comprising sampling the hydrogen sulfide-containing gas flow in a sampling tube and sensing hydrogen sulfide content in the sampling tube.

41. A method according to claim 40 further comprising periodically opening a condensation drain valve connected to the sampling tube and purging the sampling tube.

42. A method according to claim 39 further comprising sampling hydrogen sulfide content from gas discharged from the second scrubber tank in a sampling tube and sensing hydrogen sulfide content in the sampling tube.

43. A method according to claim 42 further comprising periodically opening a condensation drain valve connected to the sampling tube and purging the sampling tube.

44. A method according to claim 36 further comprising supplying make-up water to the second scrubbing solution.

45. A method according to claim 35 wherein the hydrogen sulfide scrubber further comprises at least one caustic supply; and further comprising alternating operation using the at least one caustic supply or the at least one triazine compound supply.

46. A method for retrofitting a hydrogen sulfide scrubber of a drinking water treatment system from a caustic supply to a triazine compound supply, the hydrogen sulfide scrubber comprising first and second scrubber tanks connected in series to a hydrogen sulfide-containing gas flow, the method comprising:

disconnecting the caustic supply for the first and second scrubber tank;

connecting the triazine compound supply for the second scrubber tank; and connecting scrubbing solution charging line between the second scrubber tank and the first scrubber tank.

47. A method according to claim 46 wherein the hydrogen sulfide scrubber comprises first and second scrubbing solution circulators associated with the first and second scrubber tanks; and further comprising leaving the first and second scrubbing solution circulators unchanged.

48. A method according to claim 46 wherein the hydrogen sulfide scrubber further comprises first and second make-up water supplies associated with the first and second scrubber tanks; and further comprising shutting off the first make-up water supply and reducing a flow of the second make-up water supply.

49. A method according to claim 46 further comprising:

installing at least one hydrogen sulfide sensor to sense hydrogen sulfide associated with at least one of the first and second scrubber tanks; and installing a controller to control the triazine compound supply bas upon the at least one hydrogen sulfide sensor.

* * * * *

UNITED STATES PATENT AND TRADEMARK OFFICE
CERTIFICATE OF CORRECTION

PATENT NO. : 6,773,582 B2
DATED : August 10, 2004
INVENTOR(S) : Anthony

It is certified that error appears in the above-identified patent and that said Letters Patent is hereby corrected as shown below:

Title Page,
Item [73], Assignees, delete "Tauares" insert -- Tavares --
Item [56], References Cited, OTHER PUBLICATIONS, "Quaker Chemical Corporation," reference, delete "product$_{13}$" insert -- product --

Column 8,
Line 58, delete "east" insert -- least --

Column 9,
Line 5, delete "an" insert -- and --

Column 10,
Line 18, delete "claim" insert -- claim 18 --
Line 29, delete "to"
Line 30, delete "condensate on" insert -- condensation --
Line 60, delete "lea to" insert -- least --

Column 11,
Line 2, delete "off" insert -- of --
Line 6, delete "i" insert -- in --
Line 11, delete "wit" insert -- with --
Line 16, delete "on" insert -- one --
Line 59, delete "to"

Column 12,
Line 12, delete "he" insert -- the --
Line 15, delete "to"

UNITED STATES PATENT AND TRADEMARK OFFICE
CERTIFICATE OF CORRECTION

PATENT NO.    : 6,773,582 B2
DATED         : August 10, 2004
INVENTOR(S)   : Anthony It is certified that error appears in the above-identified patent and that said Letters Patent is hereby corrected as shown below:

Column 14,
Line 9, delete "bas" insert -- based --

Signed and Sealed this

Fourteenth Day of June, 2005

JON W. DUDAS
*Director of the United States Patent and Trademark Office*